(12) United States Patent
Sasaki (10) Patent No.: US 11,616,890 B2
(45) Date of Patent: Mar. 28, 2023

(54) INFORMATION PROCESSING APPARATUS, NON-TRANSITORY COMPUTER READABLE MEDIUM STORING PROGRAM, AND INFORMATION PROCESSING METHOD FOR SETTING VALUE OF RESTARTING

(71) Applicant: FUJIFILM Business Innovation Corp., Tokyo (JP)

(72) Inventor: Hirotaka Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/377,358

(22) Filed: Jul. 15, 2021

(65) Prior Publication Data

US 2022/0294923 A1  Sep. 15, 2022

(30) Foreign Application Priority Data

Mar. 10, 2021  (JP) .............................. JP2021-038657

(51) Int. Cl.
*H04N 1/00* (2006.01)

(52) U.S. Cl.
CPC ..... *H04N 1/00917* (2013.01); *H04N 1/00891* (2013.01); *H04N 1/00899* (2013.01)

(58) Field of Classification Search
CPC .......... H04N 1/00885–00907; H04N 1/00917
See application file for complete search history.

(56) References Cited

U.S. PATENT DOCUMENTS

| 8,786,886 B2 | 7/2014 | Goda | |
| 2004/0257605 A1* | 12/2004 | Hayashi | G06F 3/1204 358/1.14 |
| 2010/0100719 A1 | 4/2010 | Chen et al. | |
| 2011/0228303 A1 | 9/2011 | Harasawa | |
| 2011/0231026 A1* | 9/2011 | Yaoyama | G06F 3/1261 700/286 |
| 2012/0191999 A1* | 7/2012 | Takatani | H04N 1/00896 713/323 |

(Continued)

FOREIGN PATENT DOCUMENTS

| JP | 2012128705 | 7/2012 |
| JP | 2012155534 | 8/2012 |
| JP | 2012187710 | 10/2012 |

OTHER PUBLICATIONS

"Search Report of Europe Counterpart Application", dated Mar. 1, 2022, pp. 1-7.

*Primary Examiner* — Nicholas Pachol
(74) *Attorney, Agent, or Firm* — JCIPRNET (57) ABSTRACT

An information processing apparatus includes a processor configured to control an operation of an apparatus by executing a control program, in a case where an instruction to shift to a power-off state is received, perform shift from a normal operation state to any one of a first power-off state or a second power-off state, the first power-off state being a state where the operation is stopped without restarting the control program, the second power-off state being a state where the control program is restarted and then the operation is stopped, and in a case where the shift to the first power-off state is made, set at least a part of information regarding an operation of the information processing apparatus to a value that is set in a case where the control program is restarted.

18 Claims, 7 Drawing Sheets

TYPES OF POWER-OFF STATE

| COMPLETE POWER-OFF MODE | STATE WHERE ALL HARDWARE IS POWERED OFF (IN CASE WHERE POWER SWITCH IS TURNED ON, ALL HARDWARE IS POWERED ON AND CPU 23 IS ALSO STARTED FROM INITIAL STATE) |
|---|---|
| SUB-POWER-OFF MODE | CPU 23 IS RESTARTED BY PERFORMING HARDWARE RESET AFTER SHUTDOWN PROCESS OF CPU 23 IS PERFORMED, AND THEN, ONLY POWER SUPPLY OF RAM 22 IS TURNED ON TO SHIFT CPU 23 TO SUSPENDED STATE |
| HIGH-SPEED STARTABLE MODE | WITHOUT SHUTTING DOWN CPU 23, POWER SUPPLY OTHER THAN RAM 22 IS TURNED OFF TO SHIFT CPU 23 TO SUSPENDED STATE |

(56) References Cited

U.S. PATENT DOCUMENTS

| | | | | |
|---|---|---|---|---|
| 2014/0119765 A1* | 5/2014 | Hosoda | ............ | G03G 15/5004 |
| | | | | 399/75 |
| 2014/0160516 A1* | 6/2014 | Maruhashi | ......... | H04N 1/00896 |
| | | | | 358/1.14 |
| 2014/0359260 A1* | 12/2014 | Utsumi | ............ | H04N 1/00885 |
| | | | | 713/1 |
| 2015/0264217 A1* | 9/2015 | Goda | ..................... | H04N 1/21 |
| | | | | 358/1.13 |
| 2020/0110455 A1* | 4/2020 | Suetani | ............ | H04N 1/00891 |

* cited by examiner

TYPES OF POWER-OFF STATE

| | |
|---|---|
| COMPLETE POWER-OFF MODE | STATE WHERE ALL HARDWARE IS POWERED OFF (IN CASE WHERE POWER SWITCH IS TURNED ON, ALL HARDWARE IS POWERED ON AND CPU 23 IS ALSO STARTED FROM INITIAL STATE) |
| SUB-POWER-OFF MODE | CPU 23 IS RESTARTED BY PERFORMING HARDWARE RESET AFTER SHUTDOWN PROCESS OF CPU 23 IS PERFORMED, AND THEN, ONLY POWER SUPPLY OF RAM 22 IS TURNED ON TO SHIFT CPU 23 TO SUSPENDED STATE |
| HIGH-SPEED STARTABLE MODE | WITHOUT SHUTTING DOWN CPU 23, POWER SUPPLY OTHER THAN RAM 22 IS TURNED OFF TO SHIFT CPU 23 TO SUSPENDED STATE |

INFORMATION PROCESSING APPARATUS, NON-TRANSITORY COMPUTER READABLE MEDIUM STORING PROGRAM, AND INFORMATION PROCESSING METHOD FOR SETTING VALUE OF RESTARTING

CROSS-REFERENCE TO RELATED APPLICATIONS

This application is based on and claims priority under 35 USC 119 from Japanese Patent Application No. 2021-038657 filed Mar. 10, 2021.

BACKGROUND

(i) Technical Field

The present invention relates to an information processing apparatus and a non-transitory computer readable medium storing a program, and information processing method.

(ii) Related Art

JP2012-128705A discloses an information processing apparatus that determines, from a state of an information processing system, whether restarting is necessary at the time of receiving a power-off request, and performs control to perform a suspended process in a case where it is determined that restarting is not necessary and perform a shutdown process in a case where it is determined that restarting is necessary.

JP2012-155534A discloses an electronic device that sets a reboot flag to on in a shutdown process at the time of powering off and performs a boot process again, where, in the boot process, the electronic device executes only a predetermined process for restarting an apparatus and shifts to a power saving mode in a case where the booting flag is set to on, and after shifting to the power saving mode, the electronic device cancels the power saving mode in a case where a power switch is turned on, and executes a subsequent boot process.

JP2012-187710A discloses an image forming apparatus that, in a case where a user gives an instruction to turn off or on a power supply unit by using a switch, issues a notification that an adjustment process is not required for a printer device and a scanner device as power monitoring H/W receives the instruction by the switch, and stops power supply to a controller excluding a memory to transition to a standby state after the controller performs a restarting process by using the memory.

SUMMARY

At the time of shifting the information processing apparatus such as an image forming apparatus to a power-off state, the apparatus may be powered off as a suspended state in which the CPU is stopped while maintaining the execution state. By shifting the apparatus to the power-off state while the CPU is in the suspended state in this way, it is possible to shorten the time until the apparatus shifts to a power-on state and achieve high-speed startup.

However, depending on the apparatus state at the time of receiving the instruction to shift to the power-off state, it may be necessary to shift to the power-off state in a state where a control program is restarted.

Therefore, depending on the apparatus state at the time of receiving the instruction to shift to the power-off state, the power-off state may be entered in a state where the control program is restarted, or the power-off state may be entered without restarting the control program.

However, in the case of returning to the power-on state after shifting to the power-off state without restarting the control program, information such as setting values related to the operation of the apparatus is not initialized and has the same value as before the shift to the power-off state.

For example, in a case where a color mode at the time of copying in the information processing apparatus such as the image forming apparatus is set as monochrome in the initialized state, a case where the color mode at the time of copying is set as monochrome and a case where the color mode is set as color may be mixed despite returning from the power-off state to the power-on state, which may lead to unintended results for a user.

Aspects of non-limiting embodiments of the present disclosure relate to an information processing apparatus and a non-transitory computer readable medium storing a program capable of making at least some of setting values related to operations of the information processing apparatus the same in a case where shift to a power-off state is made without restarting a control program and a case where the shift to the power-off state is made by restarting the control program.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to control an operation of an apparatus by executing a control program, in a case where an instruction to shift to a power-off state is received, perform shift from a normal operation state to any one of a first power-off state or a second power-off state, the first power-off state being a state where the operation is stopped without restarting the control program, the second power-off state being a state where the control program is restarted and then the operation is stopped, and in a case where the shift to the first power-off state is made, set at least a part of information regarding an operation of the information processing apparatus to a value that is set in a case where the control program is restarted.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the drawings.

Figure 1:
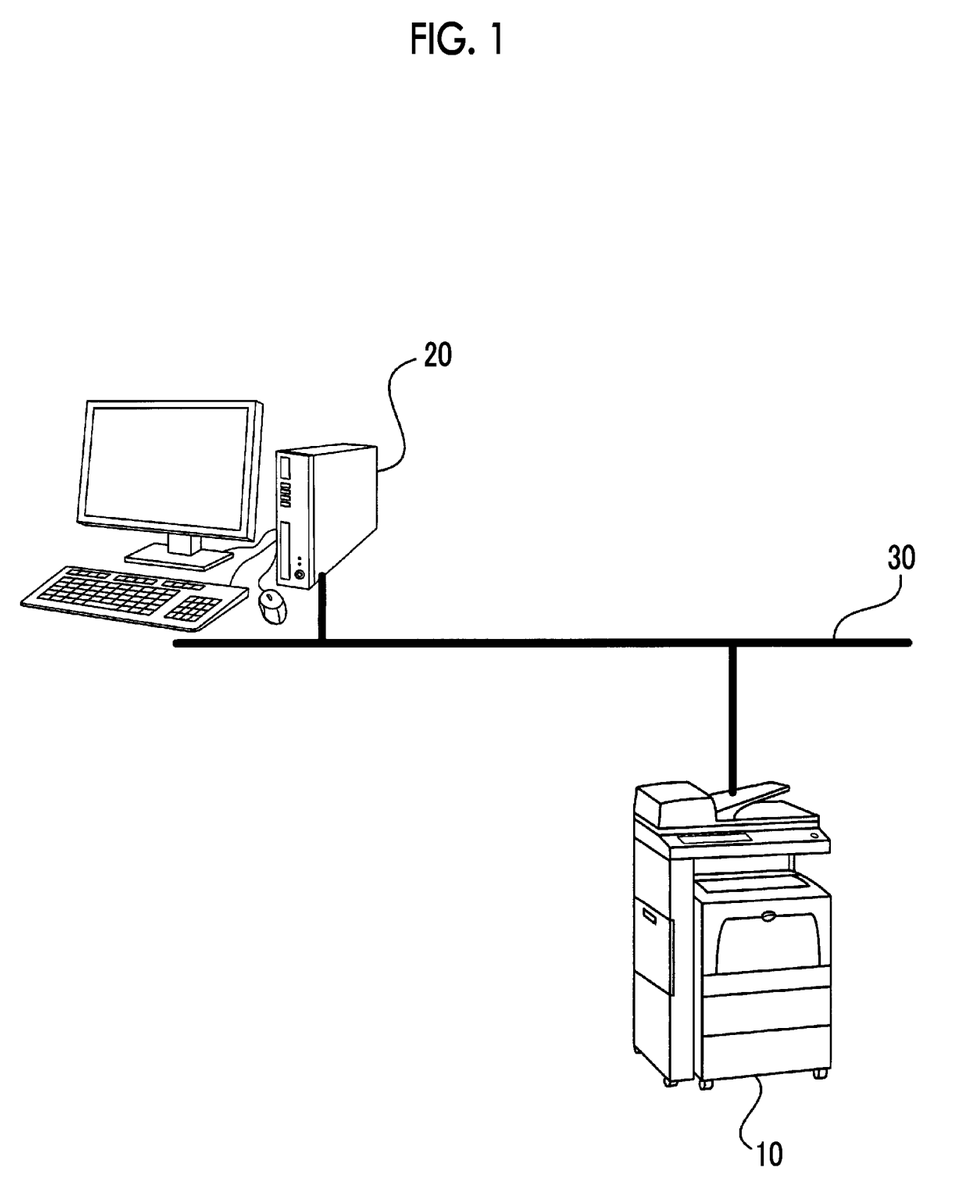
FIG. 1 is a diagram showing a system configuration of an image forming system according to an exemplary embodiment of the present invention.

FIG. 1 is a diagram showing a configuration of an image forming system according to an exemplary embodiment of the present invention.

As shown in FIG. 1, the image forming system according to the exemplary embodiment of the present invention includes an image forming apparatus 10 and a terminal device 20 connected to each other by a network 30. The terminal device 20 generates print data and transmits the generated print data to the image forming apparatus 10 via the network 30. The image forming apparatus 10 receives the print data transmitted from the terminal device 20 and outputs an image corresponding to the print data on the paper. The image forming apparatus 10 is a so-called multifunction device having a plurality of functions such as a printing function, a scanning function, a copying function, and a facsimile function.

Figure 2:
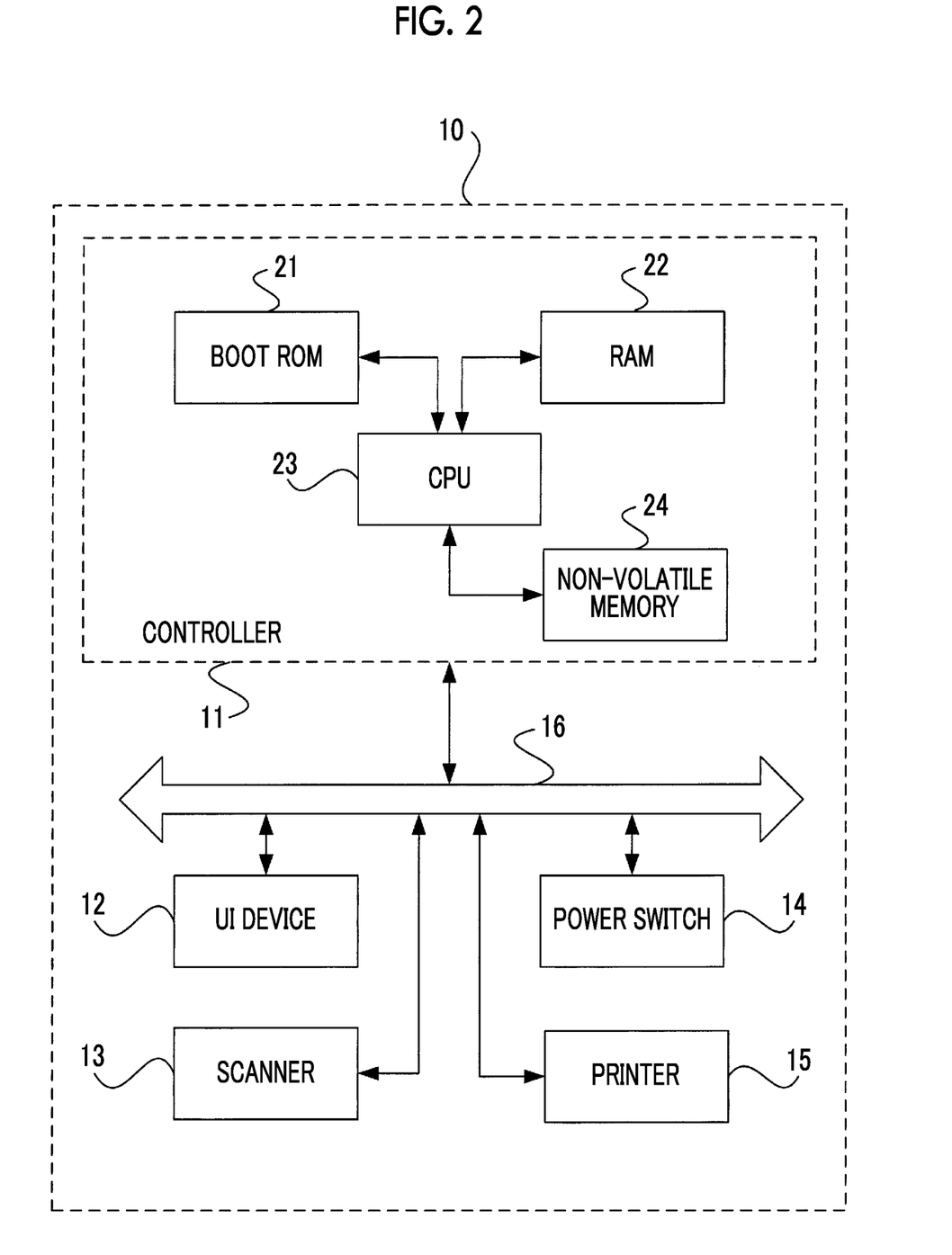
FIG. 2 is a block diagram showing a hardware configuration of an image forming apparatus 10 according to the exemplary embodiment of the present invention.

Next, FIG. 2 shows a hardware configuration of the image forming apparatus 10 in the image forming system of this exemplary embodiment.

As shown in FIG. 2, the image forming apparatus 10 includes a controller 11 that controls the operation of the entire apparatus, a user interface (abbreviated as UI) device 12 including a touch panel or a liquid crystal display and a keyboard, a scanner 13, a power switch 14, and a printer 15. These components are connected to each other via a control bus 16.

Further, the controller 11 includes a boot ROM 21, a RAM 22 which is a volatile memory, a CPU 23, and a non-volatile memory 24 composed of a flash memory, a hard disk drive (HDD), and the like.

At startup, the CPU 23 is a processor that controls the operation of the image forming apparatus 10 by loading a boot program stored in the boot ROM 21 into the RAM 22 to execute a startup process, and executing a predetermined process based on a control program stored in the non-volatile memory 24.

A UI device 12 is, for example, an operation panel composed of a touch panel, which displays various types of information to a user and inputs an operation from the user. The scanner 13 reads an original image from a set original document under the control of the controller 11. The printer 15 outputs an image on a recording medium such as printing paper under the control of the controller 11.

Further, the power switch 14 is provided to put the image forming apparatus 10 in a normal operation state into a power-off state and to put the image forming apparatus 10 in the power-off state into the normal operation state.

A power switch is also provided in the operation panel by the UI device 12, the user operates the power switch in the operation panel, and thereby the operation state of the image forming apparatus 10 is switched between the normal operation state and the power-off state.

Figure 3:
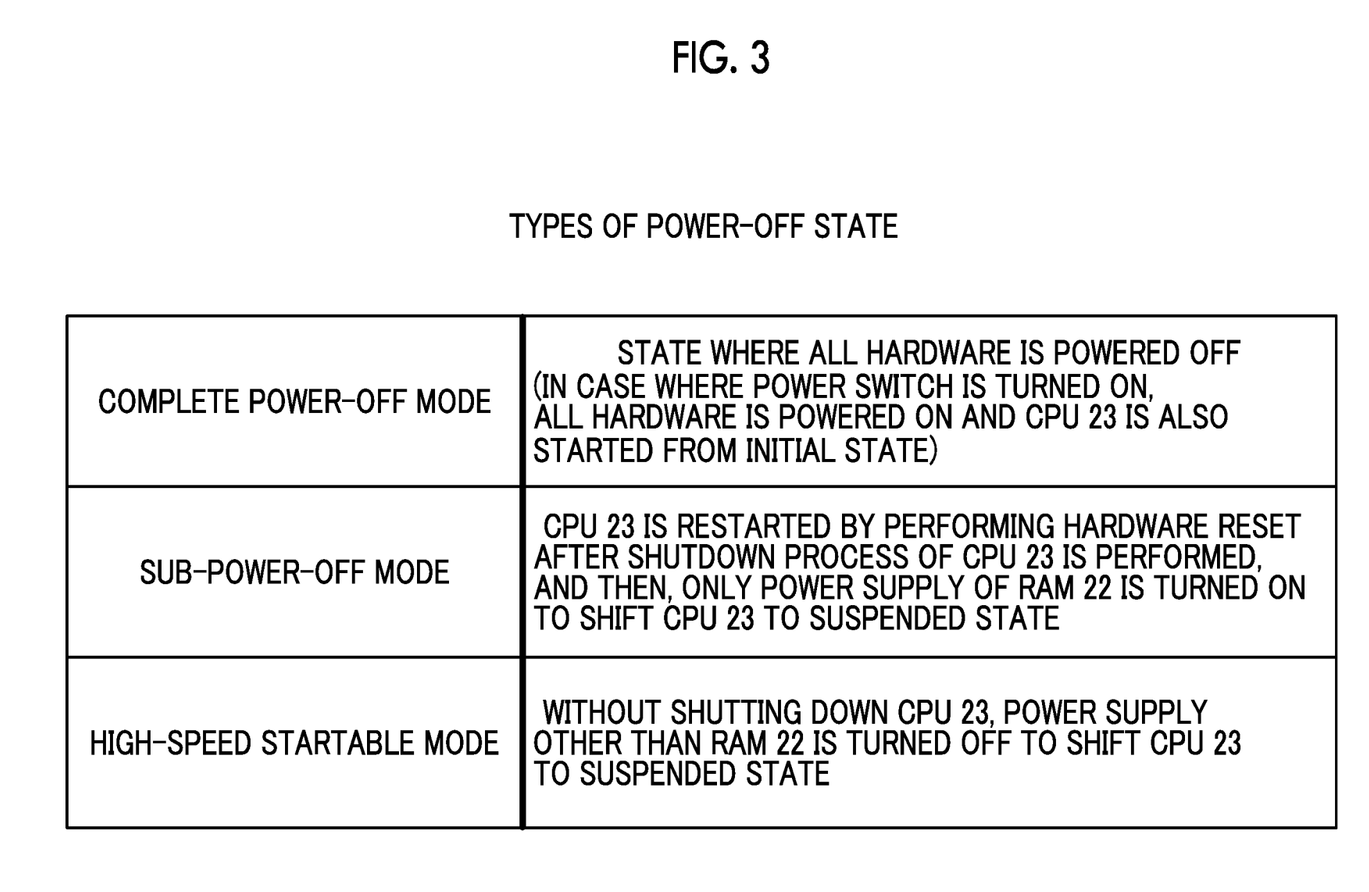
FIG. 3 is a diagram illustrating types of power-off state of the image forming apparatus 10 according to the exemplary embodiment of the present invention.

Next, the types of power-off state of the image forming apparatus 10 according to this exemplary embodiment will be described with reference to FIG. 3.

In the image forming apparatus 10 according to this exemplary embodiment, there are three power-off states: a complete power-off mode, a sub-power-off mode, and a high-speed startable mode.

Complete Power-Off Mode

Here, the power-off state in the complete power-off mode is a state where all the hardware such as the controller 11, the UI device 12, the scanner 13, and the printer 15 are powered off. At the time of returning from the power-off state in the complete power-off mode to the normal operation state, the power supply for all the hardware is turned on, and the CPU 23 is also started from the initial state. Therefore, it takes the longest startup time to return from the power-off state in the complete power-off mode to the normal operation state as compared with the other two states.

Sub-Power-Off Mode

Next, the power-off state in the sub-power-off mode will be described. In a case where a power-off instruction in the normal operation state is received and shift to the power-off state in the sub-power-off mode is made, the CPU 23 is restarted by performing a hardware reset after a shutdown process of the CPU 23 is performed. Then, in a case where the CPU 23 performs a predetermined startup process and starts up, only the power supply of the RAM 22 which is the volatile memory is turned on to shift the CPU 23 to the suspended state. In this suspended state, even though the control program is being executed, the CPU 23 stops operating at a point during execution to enter an energy-saving state. That is, in the power-off state in the sub-power-off mode, the CPU 23 is held in a state of being stopped after starting. Therefore, the returning time is shortened as compared with the case where the CPU 23 is restarted at the time when the normal operation state is returned.

In the power-off state in the sub-power-off mode, the control program is executed from the position before the suspended state even in a case where the CPU 23 is put into the suspended state and then returned to the normal operation state again.

However, at the time of shifting from the normal operation state to the power-off state in the sub-power-off mode, the shutdown process of the CPU 23 is performed, so that the control program is re-executed from the beginning.

High-Speed Startable Mode

Next, the power-off state in the high-speed startable mode will be described. Ina case where a power-off instruction in the normal operation state is received and shift to the power-off state in the high-speed startable mode is made, without shutting down the CPU 23, the power supply other than the RAM 22 which is the volatile memory is turned off to shift the CPU 23 to the suspended state.

In this way, although there are three states as the power-off state, only in the case of returning to the normal operation state after shifting to the power-off state in the high-speed startable mode, the control program is not initialized and the state before shutdown is inherited as it is.

In a case where shift to the power-off state is instructed by the operation of the power switch 14 configured by the hardware, the operation state shifts from the normal operation state to the power-off state in the complete power-off mode. Then, in a case where the power switch having a software configuration provided in the operation panel achieved by the UI device 12 is operated and the shift to the power-off state is instructed, the operation state shifts from the normal operation state to the power-off state in the sub-power-off mode or the power-off state in the high-speed startable mode.

Here, the reason why the shift to the power-off state in the complete power-off mode is made in a case where the power switch 14 configured by hardware is operated is that the operation by the user on the power switch 14 of hardware is considered a strong intention of the user to immediately shift the image forming apparatus 10 to the power-off state.

In the power-off state in the complete power-off mode, it takes time to start up and shift to the normal operation state. Therefore, in a case where a power switch having a software configuration provided in the more frequently used operation panel is operated, the shift to the power-off state in the sub-power-off mode or the power-off state in the high-speed startable mode is made. Therefore, in the following description, the power-off state in the complete power-off mode will be omitted.

However, the power-off state in the complete power-off mode is the same as the power-off state in the sub-power-off mode in that the control program is restarted from the beginning before the shift from the normal operation state to the power-off state and the return to the normal operation state.

Then, in a case where the shift from the normal operation state to the power-off state in the high-speed startable mode is made at the time when the shift to the power-off state is instructed, and the return from the power-off state in the high-speed startable mode to the normal operation state is made at the time when the shift to the power-on state is instructed, the shift time to the power-off state and the startup time to return to the normal operation state can be shortened.

However, depending on the apparatus state at the time of receiving the instruction to shift to the power-off state, a problem may occur in the shift to the power-off state in the high-speed startable mode.

For example, in a case where the user operates the power switch in the operation panel during a printing process and the shift to the power-off state is instructed, the normal operation state is returned after shifting to the power-off state in the high-speed startable mode. Then, even though the power supply of the hardware such as the printer 15 is turned on again and the apparatus is being restarted, the CPU 23 may immediately resume operation, resulting in an error in the printing process.

In a case where the CPU 23 is performing a process such as outputting a log status to the outside at the time when the shift to the power-off state is instructed, even though the shift to the power-off state in the high-speed startable mode is made, no problem occurs even at the time when the process is continued after returning to the normal operation state.

In this way, in a case where the user instructs to shift to the power-off state, depending on the operation state of the apparatus, by shifting to the power-off state in the sub-power-off mode, it may be necessary to shift to the power-off state in a state where the control program is restarted.

In other words, depending on the apparatus state at the time of receiving the instruction to shift to the power-off state, the case of shifting to the power-off state in the high-speed startable mode and the case of shifting to the power-off state in the sub-power-off mode may be mixed.

However, in a case where the power supply is turned on and the normal operation state is returned after shifting from the normal operation state to the power-off state in the high-speed startable mode, unless special processing is executed, information such as setting values related to the operation of the apparatus is not initialized and has the same value as before the shift to the power-off state.

For example, in a case where a color mode at the time of copying in the information processing apparatus such as the image forming apparatus is set as monochrome in the initialized state, a case where the color mode at the time of copying is set as monochrome and a case where the color mode is set as color may be mixed despite returning from the power-off state to the power-on state, which may lead to unintended results for a user.

In addition, regarding log information indicating an operation history such as an operation time of the apparatus and the number of times the print job is executed, even though the power-off state has been entered once, a case where the log information is initialized and a case where the log information is continued as it is without being initialized may be mixed, which may be difficult for the user to understand the operation.

Therefore, by executing the processing as described below, the image forming apparatus 10 of this exemplary embodiment is configured to make at least some of setting values related to operations of the information processing apparatus the same in a case where shift to a power-off state is made without restarting a control program and in a case where the shift to the power-off state is made by restarting the control program.

Specifically, the CPU 23 in the image forming apparatus of this exemplary embodiment performs the following operations to prevent the occurrence of the problems described above.

First, the CPU 23 controls operations of the image forming apparatus 10 by executing a control program. Then, in a case where an instruction to shift to the power-off state is received, the CPU 23 shifts from a normal operation state to any one of a power-off state in a high-speed startable mode in which the operation is stopped without restarting the control program or a power-off state in a sub-power-off mode in which the control program is restarted and then the operation is stopped.

Then, in a case where the shift to the power-off state in the high-speed startable mode is made, the CPU 23 sets at least apart of information regarding the operation of the image forming apparatus 10 which is a host apparatus to a value that is set in a case where the control program is restarted.

Here, the part of information set by the CPU 23 to the value that is set in a case where the control program is restarted may include log information which is history information indicating an operation history of the image forming apparatus 10, setting information for determining an operating condition of the image forming apparatus 10, and setting information regarding a configuration of the image forming apparatus 10.

Here, the value that is set in a case where the control program is restarted is, for example, an initial setting value that is set in a case where the control program is restarted, and specifically, in a case of shifting from the normal operation state to the power-off state in the high-speed startable mode, the CPU 23 sets a value of the setting information for determining the operating condition of the image forming apparatus 10 to an initial setting value that is set in a case where the control program is restarted.

In this exemplary embodiment, at the time of shifting from the normal operation state to the power-off state in the high-speed startable mode, the CPU 23 sets at least a part of information regarding the operation of the image forming apparatus 10 to a value that is set in a case where the control program is restarted.

However, at the time of returning from the power-off state in the high-speed startable mode to the normal operation state, the CPU 23 may set at least a part of information regarding the operation of the image forming apparatus 10 to a value that is set in a case where the control program is restarted.

Next, the operation of shifting to the power-off state in the image forming apparatus 10 of this exemplary embodiment will be described in detail with reference to the drawings.

Figure 4:
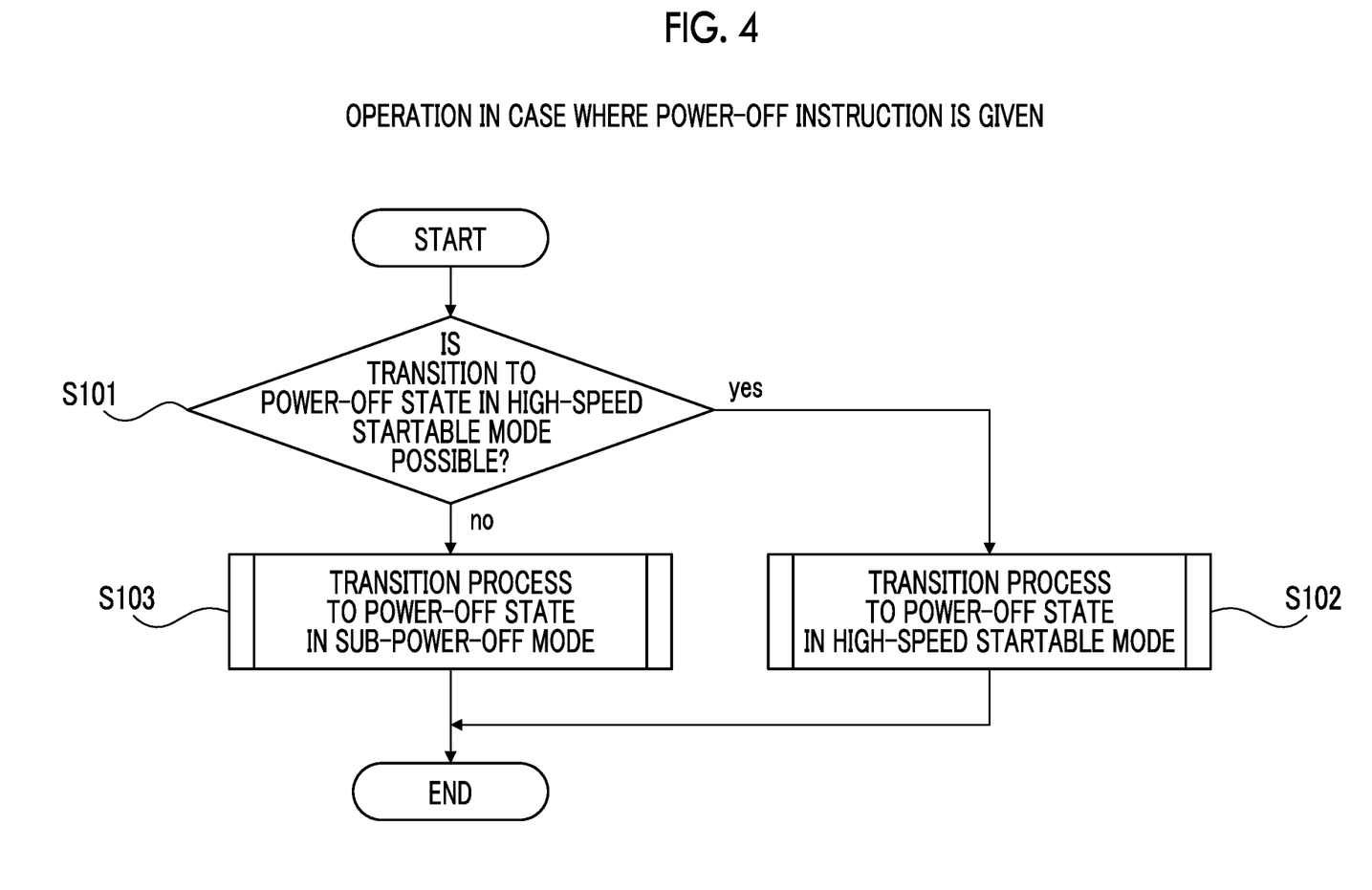
FIG. 4 is a flowchart illustrating an outline of an operation in a case where a CPU 23 is instructed to shift to a power-off state.

First, an outline of the operation in a case where the CPU 23 is instructed to shift to the power-off state will be described with reference to the flowchart of FIG. 4.

In a case where an instruction to shift to the power-off state is received, the CPU 32 determines in Step S101 whether or not it is possible to transition to the power-off state in the high-speed startable mode.

Then, in a case where it is determined in Step S101 that the transition to the power-off state in the high-speed startable mode is possible, in Step S102, the CPU 23 executes a transition process to the power-off state in the high-speed startable mode, and shifts to the power-off state in the high-speed startable mode.

In a case where it is determined in Step S101 that the transition to the power-off state in the high-speed startable mode is not possible, in Step S103, the CPU 23 executes a transition process to the power-off state in the sub-power-off mode, and shifts to the power-off state in the sub-power-off mode.

Figure 5:
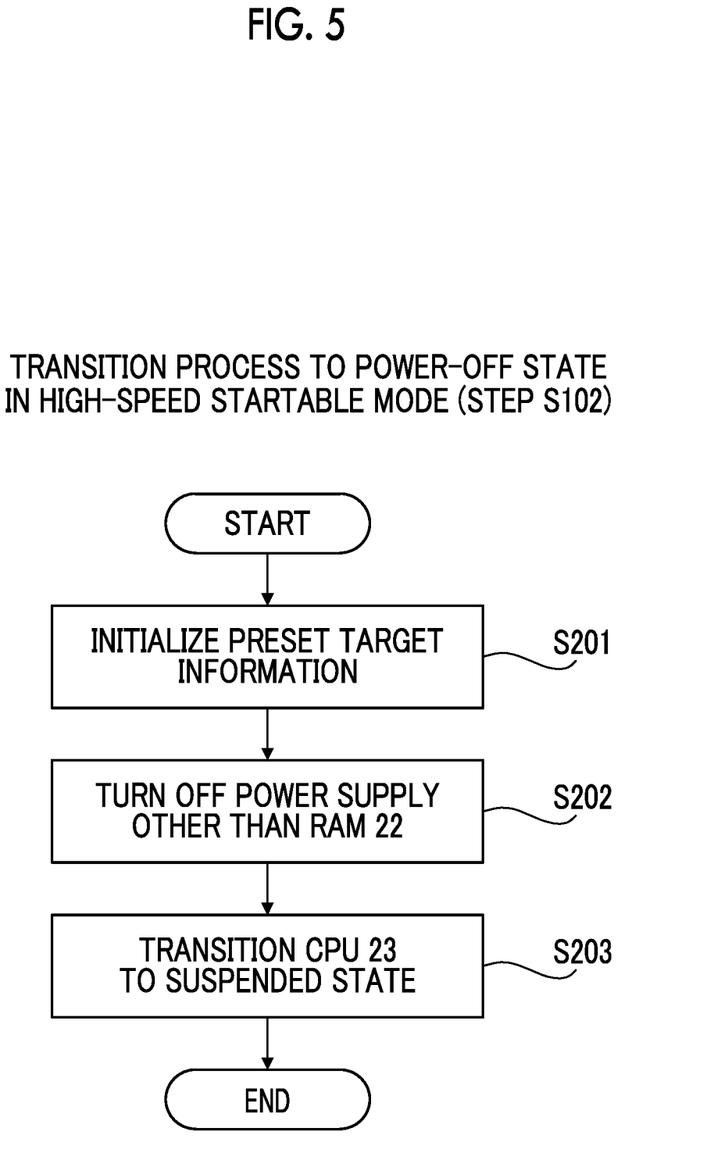
FIG. 5 is a flowchart illustrating the details of a transition process in a case where the CPU 23 transitions to a power-off state in a high-speed startable mode, which is shown in Step S102 of the flowchart of FIG. 4.

Next, the details of the transition process in a case where the CPU 23 transitions to the power-off state in the high-speed startable mode, which is shown in Step S102 of the flowchart of FIG. 4, will be described with reference to the flowchart of FIG. 5.

First, at the time of shifting to the power-off state in the high-speed startable mode, the CPU 23 initializes preset target information in Step S201.

Here, the preset target information may be selected by the operation of the user. Specifically, among the setting values related to the operation of the information processing apparatus, log information which is the history information indicating the operation history of the apparatus may be set as the target information. In addition, the information may be target information for initializing the setting information for determining the operating conditions of the image forming apparatus 10, such as the print setting, the scan setting, and the copy setting. Further, the information may be target information for initializing information on the presence/absence of an instruction to the image forming apparatus 10 such as information on the presence/absence of a print instruction.

Further, the information may be target information for initializing the setting information regarding the configuration of the image forming apparatus 10, such as information on hardware connected to the image forming apparatus 10 as an option, for example, information such as whether or not a post-processing apparatus is connected.

Such target information for initializing is generally information that is initialized in a case where the control program is restarted, but it is not necessary to set all the information to be initialized as the target information, and only a part of information to be initialized may be set as the target information.

Further, the value to be initialized does not necessarily have to be an initial value, and may be reset to any value other than the initial value.

In this exemplary embodiment, although the case where the target information is initialized or reset at the time of transition to the power-off state in the high-speed startable mode has been described, the target information may be initialized or reset at the time of returning from the power-off state in the high-speed startable mode to the normal operation state.

Such initialization or resetting of the target information may not always be performed at the time of transition to the power-off state in the high-speed startable mode, but may be performed only under specific conditions. For example, the operation by the power switch in the operation panel and the operation by the power switch 14 may switch between the case where the target information is initialized or reset and the case where the target information is not initialized or reset.

What kind of information is used as the target information may be selected from various viewpoints, but in general, it is highly possible that the user will feel less discomfort in operation in a case where the target information is information in a state that is shown to the outside of the image forming apparatus 10, that is, a state that is likely to be seen by the user.

In addition, for information used in defect analysis, such as the cumulative startup time of the control program, not using the information as the target information for initialization or resetting is highly likely to prevent the information from interfering with any defect analysis.

Figure 6:
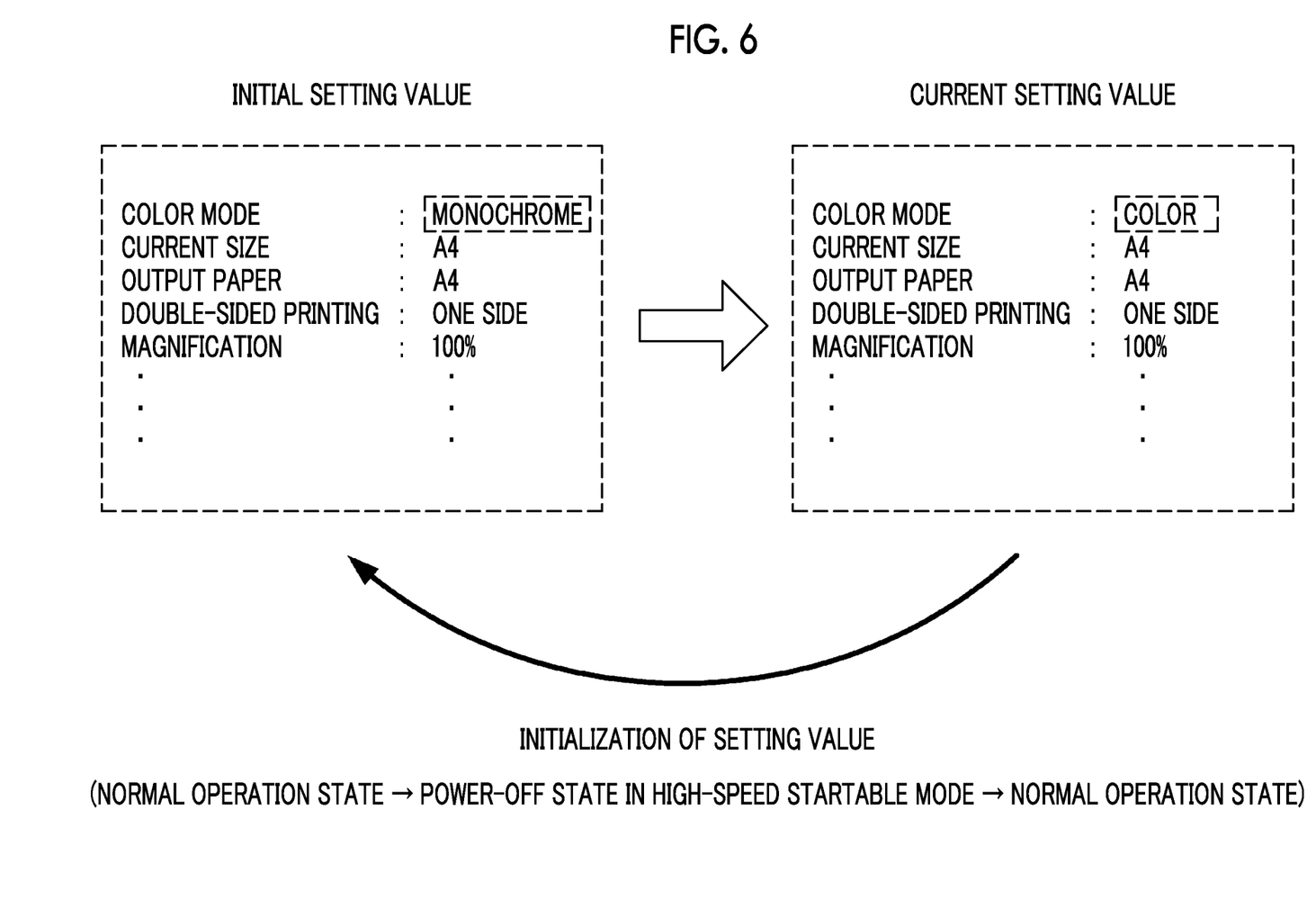
FIG. 6 is a diagram showing an example in a case where a setting value of a copy setting is initialized as target information.

FIG. 6 shows an example in a case where a setting value of a copy setting is initialized as such target information.

In the example shown in FIG. 6, it is assumed that the color mode is set as "monochrome" as an initial setting value of the copy setting. It is assumed that a user operates the operation panel or the like at the time of copying from such an initial setting value state to change the color mode to "color" and perform copying. In such a state, in a case where the shift to the power-off state is instructed, the power-off state in the high-speed startable mode is entered, then the normal operation state is returned, and the copy setting is the target information, the setting value of the copy setting is initialized and returns to the initial setting value.

That is, by performing shift from the normal operation state to the power-off state in the high-speed startable mode and then returning to the normal operation state, even though the CPU 23 has not been restarted, the copy setting is initialized and the color mode is changed from "color" to "monochrome".

After that, in the controller 11, the power supply other than the RAM 22 is turned off in Step S202, the CPU 23 transitions to the suspended state in Step S203, and the image forming apparatus 10 shifts to the power-off state in the high-speed startable mode.

Figure 7:
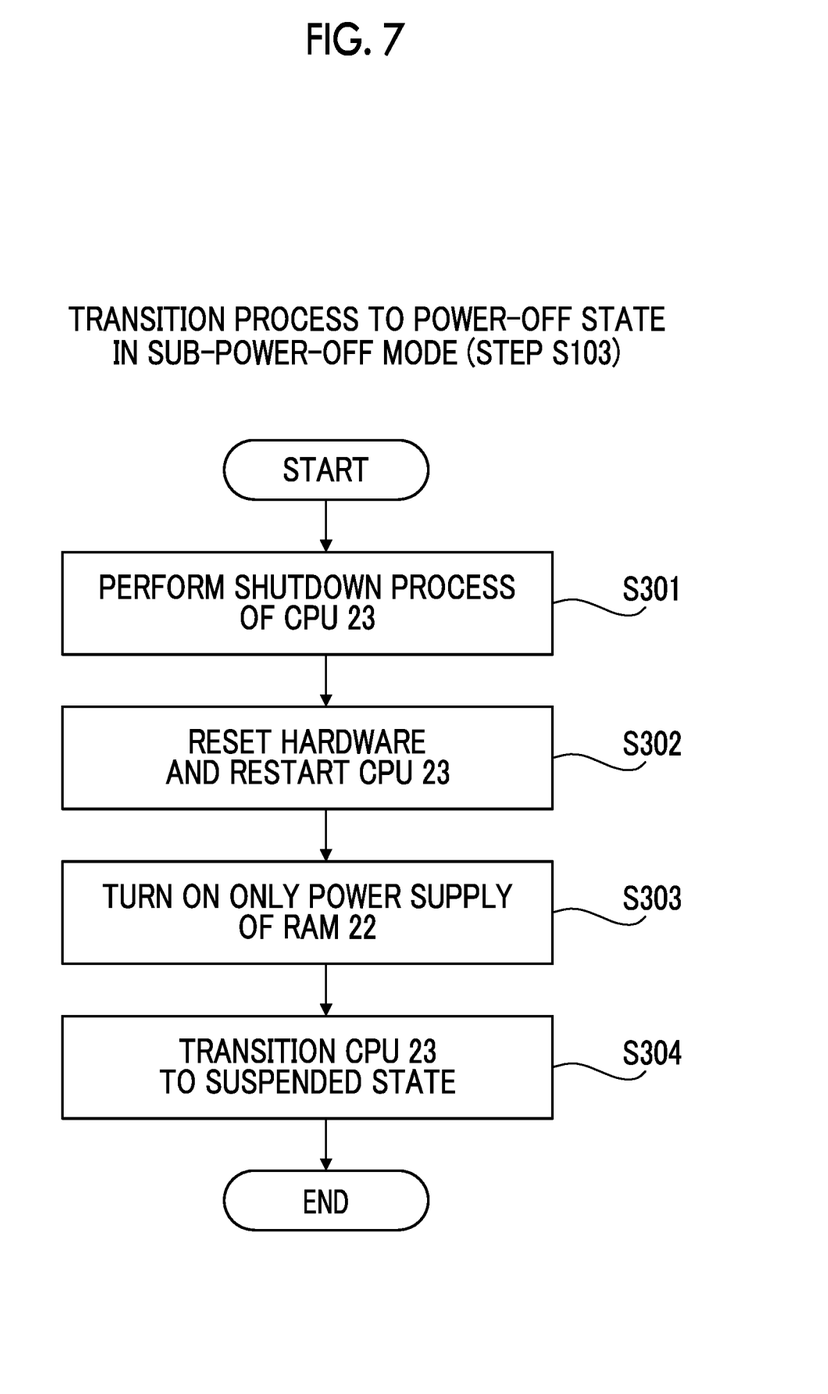
FIG. 7 is a flowchart illustrating the details of a transition process in a case where the CPU 23 transitions to a power-off state in a sub-power-off mode, which is shown in Step S103 of the flowchart of FIG. 4.

Finally, the details of the transition process in a case where the CPU 23 transitions to the power-off state in the sub-power-off mode, which is shown in Step S103 of the flowchart of FIG. 4, will be described with reference to the flowchart of FIG. 7.

First, at the time of shifting to the power-off state in the sub-power-off mode, the CPU 23 performs a shutdown process in Step S301.

Then, in the controller 11, in Step S302, the hardware is reset and the CPU 23 is restarted.

After that, in the controller 11, only the power supply of the RAM 22 is turned on in Step S303, the CPU 23 transitions to the suspended state in Step S304, and the image forming apparatus 10 shifts to the power-off state in the sub-power-off mode.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

MODIFICATION EXAMPLE

In the above exemplary embodiment, the case where the image forming apparatus 10 shifts from the normal operation state to the power-off state has been described. However, the present invention is not limited thereto, and the present invention can be similarly applied to other information processing apparatuses such as personal computers and mobile terminal devices such as smartphones, even in a case where the normal operation state shifts to the power-off state.

Further, in the above exemplary embodiment, it has been described that in a case where the power switch 14 having a hardware configuration is operated, the shift to the power-off state in the complete power-off mode is made, and in a case where the power switch having a software configuration in the operation panel is operated, the shift to any one of the power-off state in the sub-power-off mode or the power-off state in the high-speed startable mode is made. However, the present invention is not limited to such a case.

The present invention can also be applied to a case where there are a plurality of power switches by performing control to determine whether to shift to the power-off state in the sub-power-off mode or the power-off state in the high-speed startable mode during the operation of a specific power switch, and make transition to a specific power-off state without making such a determination in a case where a power switch other than the specific power switch is operated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
control an operation of an apparatus by executing a control program, wherein in response to execution of the control program, a part of information regarding an operation of the information processing apparatus is initialized to initial value;
during the operation of the information processing apparatus, set the part of information to a first value different from the initial value;
in a case where an instruction to shift to a power-off state is received, perform shift from a normal operation state to any one of a first power-off state or a second power-off state, the first power-off state being a state where the operation is stopped without restarting the control program, the second power-off state being a state where the control program is restarted and then the operation is stopped; and
in a case where the shift to the first power-off state is made, set the part of information regarding the operation of the information processing apparatus to the initial value that is set in a case where the control program is restarted and different from the first value.

2. The information processing apparatus according to claim 1,
wherein the part of information includes history information indicating an operation history of the information processing apparatus.

3. The information processing apparatus according to claim 2, wherein the processor is configured to:
at the time of shifting from the normal operation state to the first power-off state, set at least a part of information regarding the operation of the information processing apparatus to a value that is set in a case where the control program is restarted.

4. The info nation processing apparatus according to claim 2, wherein the processor is configured to:
at the time of returning from the first power-off state to the normal operation state, set at least a part of information regarding the operation of the information processing apparatus to a value that is set in a case where the control program is restarted.

5. The information processing apparatus according to claim 1,
wherein the part of info nation includes setting information for determining an operating condition of the information processing apparatus.

6. The information processing apparatus according to claim 5, wherein the processor is configured to:
in a case where the shift from the normal operation state to the first power-off state is made, set a value of the setting information for determining the operating condition of the information processing apparatus to an initial setting value that is set in a case where the control program is restarted.

7. The information processing apparatus according to claim 6, wherein the processor is configured to:
at the time of shifting from the normal operation state to the first power-off state, set at least a part of information regarding the operation of the information processing apparatus to a value that is set in a case where the control program is restarted.

8. The information processing apparatus according to claim 6, wherein the processor is configured to:
at the time of returning from the first power-off state to the normal operation state, set at least a part of information regarding the operation of the information processing apparatus to a value that is set in a case where the control program is restarted.

9. The information processing apparatus according to claim 5, wherein the processor is configured to:
at the time of shifting from the normal operation state to the first power-off state, set at least a part of information regarding the operation of the information processing apparatus to a value that is set in a case where the control program is restarted.

10. The information processing apparatus according to claim 5, wherein the processor is configured to:
at the time of returning from the first power-off state to the normal operation state, set at least a part of information regarding the operation of the information processing apparatus to a value that is set in a case where the control program is restarted.

11. The information processing apparatus according to claim 1,
wherein the part of information includes setting information regarding a configuration of the information processing apparatus.

12. The information processing apparatus according to claim 11, wherein the processor is configured to:
at the time of shifting from the normal operation state to the first power-off state, set at least a part of information regarding the operation of the information processing apparatus to a value that is set in a case where the control program is restarted.

13. The information processing apparatus according to claim 11, wherein the processor is configured to:
at the time of returning from the first power-off state to the normal operation state, set at least a part of information regarding the operation of the information processing apparatus to a value that is set in a case where the control program is restarted.

14. The information processing apparatus according to claim 1, wherein the processor is configured to:
at the time of shifting from the normal operation state to the first power-off state, set at least a part of information regarding the operation of the information processing apparatus to a value that is set in a case where the control program is restarted.

15. The information processing apparatus according to claim 1, wherein the processor is configured to:
at the time of returning from the first power-off state to the normal operation state, set at least a part of information regarding the operation of the information processing apparatus to a value that is set in a case where the control program is restarted.

16. The information processing apparatus according to claim 1, wherein, in the case where the shift to the first power-off state is made, the processor is further configured to not to set other part of information regarding the operation of the information nation processing apparatus to the initial value that is set in the case where the control program is restarted.

17. A non-transitory computer readable medium storing a program causing a computer to execute a process comprising:
controlling an operation of an apparatus by executing a control program, wherein in response to execution of the control program, a part of information regarding an operation of the information processing apparatus is initialized to initial value;
during the operation of the information processing apparatus, setting the part of information to a first value different from the initial value;
in a case where an instruction to shift to a power-off state is received, performing shift from a normal operation state to any one of a first power-off state or a second power-off state, the first power-off state being a state where the operation is stopped without restarting the control program, the second power-off state being a state where the control program is restarted and then the operation is stopped; and
in a case where the shift to the first power-off state is made, setting the part of information regarding the operation of the information processing apparatus to the initial value that is set in a case where the control program is restarted and different from the first value.

18. An information processing method comprising:
controlling an operation of an apparatus by executing a control program, wherein in response to execution of the control program, a part of information regarding an operation of the information processing apparatus is initialized to initial value;
during the operation of the information nation processing apparatus, setting the part of information to a first value different from the initial value;
in a case where an instruction to shift to a power-off state is received, performing shift from a normal operation state to any one of a first power-off state or a second power-off state, the first power-off state being a state where the operation is stopped without restarting the control program, the second power-off state being a state where the control program is restarted and then the operation is stopped; and
in a case where the shift to the first power-off state is made, setting the part of information regarding the operation of the information processing apparatus to the initial value that is set in a case where the control program is restarted different from the first value.

* * * * *